United States Patent [19]

Selvey

[11] Patent Number: 4,789,574
[45] Date of Patent: Dec. 6, 1988

[54] REMOVABLE PROTECTIVE LINER FOR VEHICLES

[76] Inventor: Timothy C. Selvey, 316 Campground Pond Rd., Tallahassee, Fla. 32304

[21] Appl. No.: 62,249

[22] Filed: Jun. 15, 1987

Related U.S. Application Data

[63] Continuation-in-part of Ser. No. 847,617, Apr. 2, 1986, abandoned.

[51] Int. Cl.$^4$ .......................... B60R 13/00; B32B 3/26
[52] U.S. Cl. .......................................... 428/31; 428/52; 428/54; 428/56; 428/71; 428/316.6; 428/523; 428/100; 428/99; 296/39.2
[58] Field of Search ...................... 428/31, 523, 52, 54, 428/56, 100, 71, 99, 316.6; 296/39 R

[56] References Cited

U.S. PATENT DOCUMENTS 3,202,193  8/1965  Ware ....................................... 428/52
4,091,149  5/1978  Oxendine ............................... 428/33

FOREIGN PATENT DOCUMENTS 0219046  12/1983  Japan ..................................... 428/518
0025740A  2/1985  Japan ..................................... 428/31

Primary Examiner—P. C. Ives
Attorney, Agent, or Firm—Charles J. Prescott

[57] ABSTRACT

A removable protective liner adapted to fit and be releasably connectable atop the enclosed, generally horizontal rear bed of vehicles such as Blazers ®, Broncos ®, Cherokees ®, and the like. The liner is formed of a horizontal panel fabricated of thin flexible sheet material such as vinyl or naugahide ® and is adapted to cover substantially the entire rear bed and the rear seats of such vehicles in their folded down position. The liner may also include side panels and a spare tire cover extending upwardly from the side margins of the horizontal panels. The releasable attaching means between the liner and the vehicle rear bed may be Velcro ®, mating snaps, or the like.

5 Claims, 1 Drawing Sheet

REMOVABLE PROTECTIVE LINER FOR VEHICLES

BACKGROUND OF THE INVENTION

This is a continuation-in-part of U.S. patent application Ser. No. 487,617 originally filed on Apr. 2, 1986, now abandoned.

This invention relates generally to protective devices for the beds of trucks, and more particularly to a flexible, pliable formed linern adapted to protect the enclosed rear bed of small luxury truck-type vehicles.

Vehicles which include an enclosed rear bed portion and, optionally, also having a rear seat which folds partially or completely into the rear bed to provide an enlarged working surface for transporting objects and animals, generally also serve as a family-type vehicle suited for routine transportation such as do other pleasure vehicles. Normally the rear seats of such vehicles, currently distributed under various trademarks such as BRONCO ®, BLAZER ®, CHEROKEE ®, JEEP ® and the like are routinely used during a short period of time in both modes, that is, both as a passenger transportation pleasure vehicle and as a more utilitarian working vehicle for transporting utilitarian objects as a light-duty work vehicle. The conversion therefor is made relatively simple by the design and foldability of the rear seat which may quickly be converted from seating for two or three passengers behind the front seat of the vehicle into an extension of the rear bed of the enclosed rear of the vehicle for utility purposes.

The regular conversion and use of such vehicles between that of a utility-type vehicle and a pleasure vehicle quickly leads to the deterioration of the appearance of that portion of such vehicles wherein the painted and upholstered surfaces become scratched and accumulate dirt and debris quickly. Thus, even though the rear seating arrangement, when in its out folded position for use, remains somewhat clean, the remainder of the rear surfaces therebehind rapidly deteriorate and detract from the pleasure-type aspects of such vehicles during normal transportation use by people.

Contained within prior art are the well-known thin, rigid plastic fully formed inserts which mate with and protect the inner surfaces of open pick-up type trucks. These inserts are removable and serve to protect the appearance and finish of such open-type truck beds during transportation of heavy articles, sand, gravel and the like. However, the storage of such protective devices is difficult at best and, as a result, such protective devices are generally always left in place atop the open bed of the truck. This in-place storage may result in abrasion to the undersurface, as well as accelerated rusting of the bed due to water and debris being trapped therebetween.

Applicant is also aware of such devices as disclosed in U.S. Pat. No. 4,091,149 to Oxendine directed to a composite pad construction adapted to overly the bed of a flat bed vehicle. However, this invention is directed to structure which is more cumbersome to deal with and also is intended to serve as an undercushion upon which passengers may sit or recline.

The present invention provides a quickly storable and deployable protective liner for such vehicles with enclosed rear beds and cargo areas when used for utilitarian purposes and, particularly wherein the rear seat is folded into its stored position to serve as an extension of the rear bed of these vehicles. The invention is easily installable and removable and provides sufficient durability to take the abuse of the light duty utility usage of such vehicles which normally are not expected to incur the heavy abuse of more utilitarian open pick-up type trucks and the like. The invention also includes releasable detaching means to allow it will remain in place during use, while also providing easy removability, cleaning and storage when not in use.

BRIEF DESCRIPTION OF THE INVENTION

The present invention is directed to a removable protective liner adapted to fit and be releasably connectable atop the enclosed, generally horizontal rear bed of enclosed vehicles such as BLAZERS ®, BRONCOS ®, CHEROKEES ®, and the like. The liner is formed of a main horizontal panel fabricated of thin flexible sheet material such as vinyl or NAUGAHYDE ® and is adapted to cover substantially the entire rear bed and the rear seats of such vehicles in their folded down position. The liner may also include side panels and a spare tire cover extending upwardly from the side margins of the horizontal panels. The releasable attaching means between the liner and the vehicle rear bed may be VELCRO ®, mating snaps, or the like.

It is therefore an object of the present invention to provide a light-weight, removable protective liner for the rear enclosed cargo area of vehicles adapted to be used both for pleasure and utility.

It is another object of the above invention to provide the protective liner which is securely attachable to, and releasable from, its in-use position.

It is another object to provide the above invention which is easily foldable and storable when not in use.

In accordance with these and other objects which will become apparent hereinafter, the instant invention will now be described with reference to the accompanying drawings in which:

DETAILED DESCRIPTION OF THE INVENTION

Figure 1:
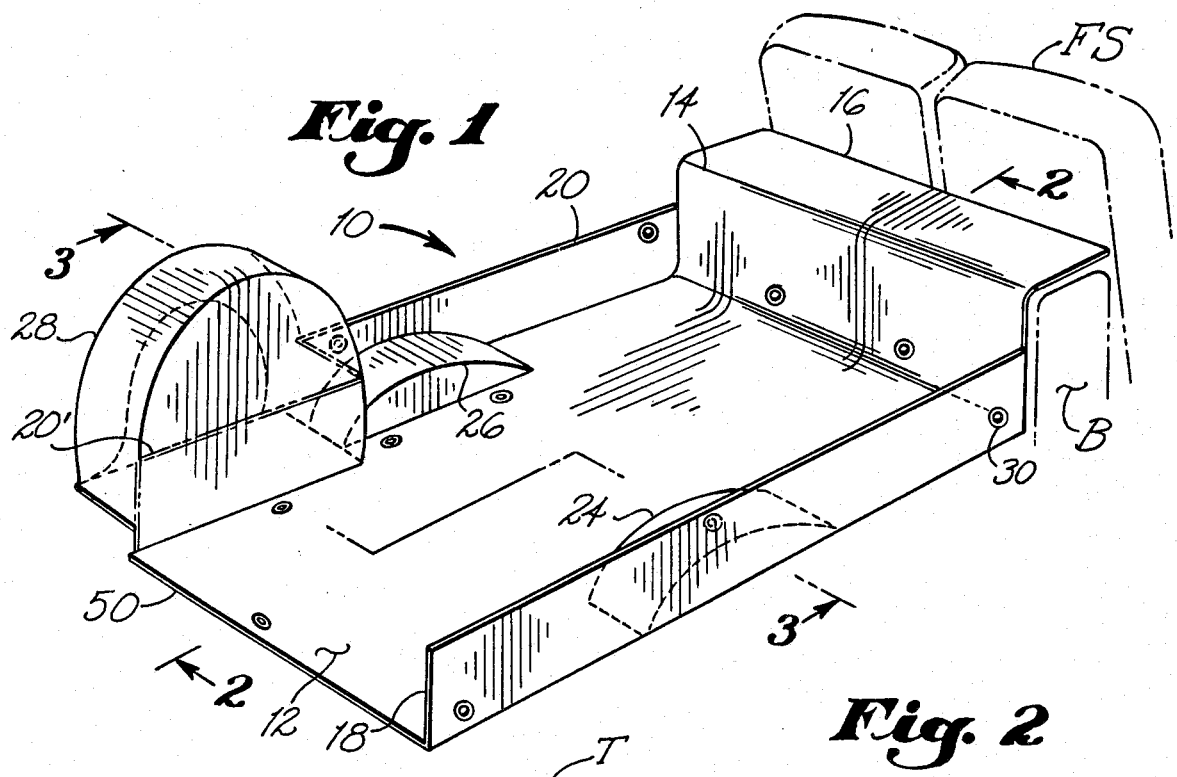
FIG. 1 is a perspective view of the preferred embodiment of the invention in place atop the enclosed rear cargo area of a vehicle.
Figure 2:
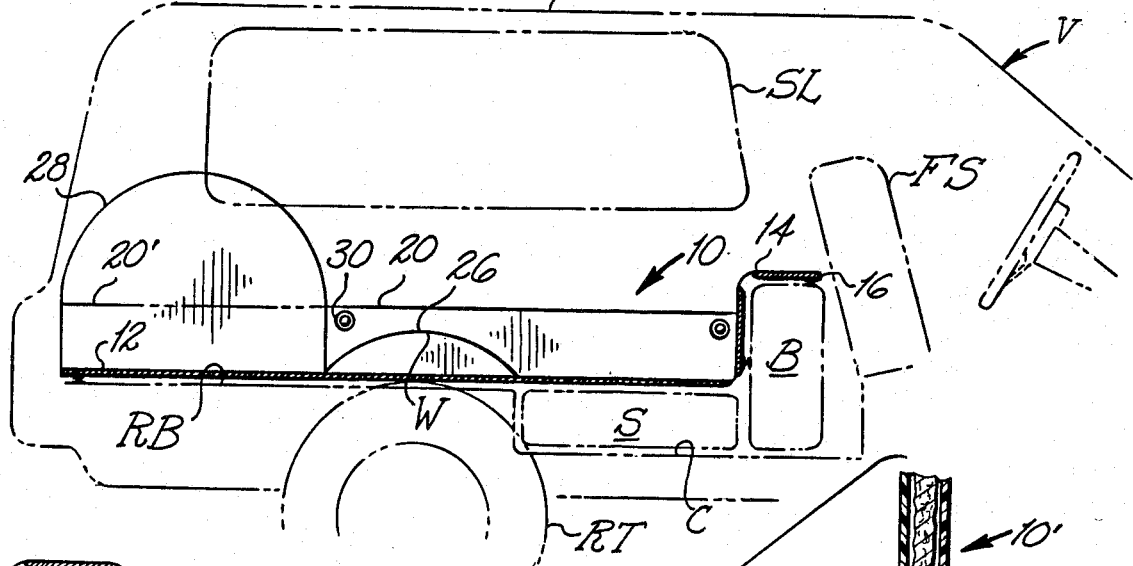
FIG. 2 is a section view in the direction of arrows 2—2 in FIG. 1.
Figure 3:
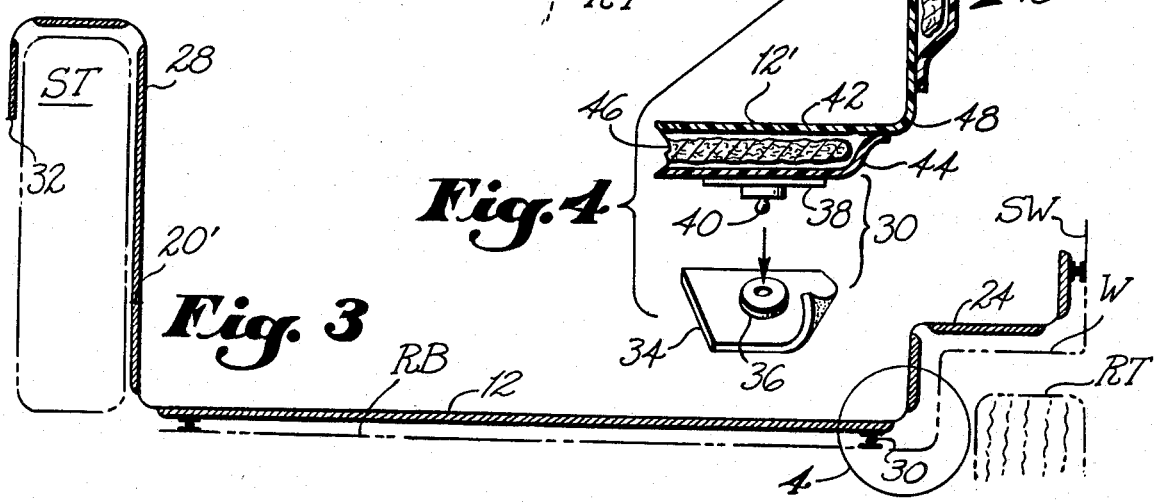
FIG. 3 is a section view in the direction of arrows 3—3 in FIG. 1.

Referring now to FIGS. 1 through 4, the preferred embodiment of the invention is shown generally at numeral 10 fitted into and atop the rear bed RB of vehicle V. When the rear seat S and back B are folded for storage into cavity C, the rear bed RB is extended forwardly up to, or adjacent to, the front seat FS of vehicle V as best seen in FIG. 2. In these general types of vehicles, top T, typically including window side light SL, encloses the entire cargo and rear passenger area above the rear bed RB to provide an environmentally protected passenger/cargo area therewithin. Also typical in such vehicles are wheel wells W upwardly extending from the rear bed RB which are required to afford travel clearance for rear tires RT. Additionally found within the rear cargo area above the rear bed RB is spare tire ST which is typically attached to one of the cargo area side walls of the vehicle V.

The protective liner 10 includes a horizontal panel 12 which substantially covers the horizontal rear bed RB of the vehicle V. Additionally, the horizontal panel 12 extends forwardly at 14 to front margin 16 sufficiently to completely protectively cover the rear seats and back B when the protective liner 10 is in use.

Pockets 24 and 26, connected to the side margins and a part of horizontal panel 12, are provided to contour and protectively mate over wheel wells W. Side panels 18 and 20 are also provided which upwardly extend from the side margins of horizontal panel 12 to provide additional protection for the lower sides of the cargo area of the vehicle V. Likewise, spare tire cover 28 may also be provided to substantially wrap around the exposed surfaces of spare tire ST, ending at margin 32; however, alternately, side panel 20 may continue to the rear margin 50 of horizontal panel 12 along 20' so as not to cover the spare tire ST.

Figure 4:
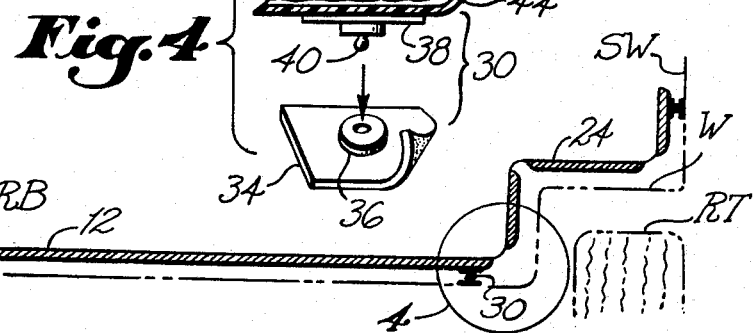
FIG. 4 is an enlarged view of area 4 in FIG. 3 except depicting an alternate multi-layered sheet material used in construction of the invention.

The preferred material for fabricating the vinyl protector is in the form of a single sheet of flexible, pliable material such as vinyl or NAUGAHYDE ® which not only reduces the overall weight of the invention, but also provides for easy folding and storage thereof when not in use. Two part snaps 30 are provided in various locations within the protective liner 10, the structure which is best seen in FIG. 4. Upper sheet 38 is attachable to horizontal panel 12' and includes tip 40 which mateably engages in apertured disk 36 attached to lower sheet 34 which, in turn, is attachable to the metal surface of the rear bed RB or other appropriate surfaces of the vehicle V. An alternate embodiment of snap 30 may be two part mating VELCRO ® material, one side of which is adhered to the protective liner 10, while the other side of the VELCRO ® is adhered to the appropriate interior surface of the vehicle V for releasable mating contact therebetween.

In FIG. 4, an alternate embodiment of the sheet material used in the formation of the protective liner 10' is there shown. Horizontal panel 12', and substantially all other portions of the protective liner 10', include an inner and outer sheet 42 and 44 respectively of thin flexible, pliable material, such as vinyl or NAUGAHYDE ®, and also includes a padded layer 46 therebetween. As shown, at the margins 48, outer sheet 44 and padding 46 are omitted to facilitate folding to follow the contours of the interior. This multi-layered structure is provided to enhance the protective nature of the invention and also to provide an additional protective characteristic for objects and individuals which find themselves atop this embodiment 10' of the invention during use.

As provided by this invention, then, a user having such a convertible luxury passenger/light cargo vehicle V may quickly fold down the rear seats thereof and unfold and install the previously stored instant invention 10 or 10', deploying it atop the rear bed RB of the vehicle V and releasably snapping it into mating position for use in protecting the paint and upholstery of this rear cargo area of the vehicle V while transporting cargo thereatop. Afterwards, the invention 10 or 10' may be quickly removed, the rear seat put back into position for use, the invention 10 or 10' folded and stored in a suitable small area within the vehicle V. It should be noted that this invention is not only applicable for transporting cargo, but may also be used for protecting the interior of the vehicle V while transporting animals, house pets or the like.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A removable protective enclosed truck bed liner adapted to protectively cover a vehicle's enclosed rear cargo area bed, the enclosed cargo area convertible in use for both pleasure and utility, said lining comprising:

a panel formed of a continuous inner sheet of flexible, pliable material having front, back and side margins, an outer sheet and a padding layer;

said panel sized to protectively cover substantially all of the vehicle's generally horizontal rear cargo area bed;

said panel also having a contour adjacent said front margin adapted to fit over the vehicle's rear seat in its folded down position;

said panel also having a contour adjacent each said side margin adapted to fit over the vehicle's rear raised wheel wells;

said margins having no padding and outer sheet, whereby said panel is readily folded at said margins to form said contours;

said panel also including means for releasably attaching said panel atop the rear cargo area bed and folded-down rear seat of the vehicle.

2. A removable protective liner as set forth in claim 1, further comprising:

side panels formed of said sheet material and connected to and upwardly extending from said side margins;

said side panels at least partially protectively covering the outer sides of the rear cargo area bed; and means for releasably attaching said side panels against the enclosed rear cargo area sides.

3. A removable protective liner as set forth in claim 2, further comprising:

a spare tire cover formed of said sheet material and connected to one said side margin;

said spare tire cover at least partially protectively covering the exposed surfaces of the vehicle's spare tire mounted within the enclosed rear cargo area.

4. A removable protective liner as set forth in claim 3, wherein:

said sheet material is vinyl.

5. A removable protective liner as set forth in claim 1, wherein:

said releasable attaching means is mating interengaging snaps.

* * * * *